(12) United States Patent
Gou et al.

(10) Patent No.: US 10,212,606 B2
(45) Date of Patent: Feb. 19, 2019

(54) METHOD AND APPARATUS FOR SENDING AND RECEIVING UNLICENSED CARRIER INFORMATION

(71) Applicant: ZTE CORPORATION, Shenzhen, Guangdong Province (CN)

(72) Inventors: Wei Gou, Shenzhen (CN); Bo Dai, Shenzhen (CN); Yajun Zhao, Shenzhen (CN); Zhaohua Lu, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 49 days.

(21) Appl. No.: 15/506,255

(22) PCT Filed: Aug. 21, 2015

(86) PCT No.: PCT/CN2015/087855
§ 371 (c)(1),
(2) Date: Feb. 24, 2017

(87) PCT Pub. No.: WO2016/029827
PCT Pub. Date: Mar. 3, 2016

(65) Prior Publication Data
US 2017/0280331 A1 Sep. 28, 2017

(30) Foreign Application Priority Data

Aug. 25, 2014 (CN) .......................... 2014 1 0423088

(51) Int. Cl.
*H04W 16/14* (2009.01)
*H04L 5/00* (2006.01)
(Continued)

(52) U.S. Cl.
CPC ............. *H04W 16/14* (2013.01); *H04L 5/001* (2013.01); *H04L 5/0005* (2013.01);
(Continued)

(58) Field of Classification Search
CPC . H04W 16/14; H04W 72/0453; H04W 24/10; H04W 72/0486; H04W 74/0816;
(Continued)

(56) References Cited

U.S. PATENT DOCUMENTS

| 2012/0300712 | A1 | 11/2012 | Hakola et al. | |
| 2016/0044638 | A1* | 2/2016 | Gao | H04W 72/042 370/280 |
| 2016/0366594 | A1* | 12/2016 | Chang | H04W 16/14 |

FOREIGN PATENT DOCUMENTS

| CN | 101047432 A | 10/2007 |
| CN | 103338454 A | 10/2013 |
| CN | 104301273 A | 1/2015 |

OTHER PUBLICATIONS

English translation of Linjun et al. (CN 101047432).*

* cited by examiner

*Primary Examiner* — Kwang B Yao
*Assistant Examiner* — Moo Jeong
(74) *Attorney, Agent, or Firm* — Ling Wu; Stephen Yang; Ling and Yang Intellectual Property

(57) ABSTRACT

The embodiment of the present disclosure provides a method and an apparatus for sending and receiving unlicensed carrier information. The method includes that a base station sending unlicensed carrier information, herein the unlicensed carrier information includes one or more pieces of the following information: information about a start point of a contention backoff window and information about a backoff moment in the contention backoff window; and a receiving end receiving the unlicensed carrier information.

12 Claims, 2 Drawing Sheets

(51) Int. Cl.
*H04W 74/08* (2009.01)
*H04L 27/00* (2006.01)
*H04W 72/04* (2009.01)
*H04W 24/10* (2009.01)
*H04L 27/26* (2006.01)

(52) U.S. Cl.
CPC .......... *H04L 5/0007* (2013.01); *H04L 5/0048* (2013.01); *H04L 5/0091* (2013.01); *H04L 27/0006* (2013.01); *H04L 27/2608* (2013.01); *H04W 24/10* (2013.01); *H04W 72/0453* (2013.01); *H04W 72/0486* (2013.01); *H04W 74/0816* (2013.01); *H04L 5/0053* (2013.01)

(58) Field of Classification Search
CPC . H04L 5/0091; H04L 27/2608; H04L 5/0005; H04L 27/0006; H04L 5/0048; H04L 5/0007; H04L 5/001; H04L 5/0053
See application file for complete search history.

METHOD AND APPARATUS FOR SENDING AND RECEIVING UNLICENSED CARRIER INFORMATION

TECHNICAL FIELD

The present disclosure relates to the field of communication, in particular to a method and an apparatus for sending and receiving unlicensed carrier information.

BACKGROUND

Up to now, as everyone knows, the Long Term Evolution (LTE) system is deployed in licensed carriers for operation. However, with the evolution of the LTE system, in the second half of year 2013, some companies (such as America Qualcomm Corporation) put forward a suggestion of carrying out a study on deployment of the LTE system in unlicensed carriers. However, up to now, it has not been accepted by relevant organizations of LTE and no project has already been established.

Qualcomm Corporation gives the following main project establishment reasons: with the rapid increase of data service, licensed spectrums cannot bear such huge data volume in near future, and thus it is suggested to consider deploying LTE in unlicensed spectrums and sharing data traffic in licensed carriers through unlicensed spectrums.

Unlicensed spectrums have many advantages, which are mainly reflected as follows:

1. It is free/low-cost. Since unlicensed spectrums do not need to be purchased, the cost of unlicensed spectrums is almost zero.

2. Admission requirements are low and the cost is low. Individuals and enterprises can participate in deployment and devices of any device manufacturers may be used.

3. Resources can be shared. When multiple different systems operate in the same unlicensed spectrum or different operators of the same system operate in the same unlicensed spectrum, some resource share modes may be used and thereby the efficiency of the spectrums can be improved.

4. Wireless access technologies are many. The operation across different communication standards can be realized, it is difficult to realize collaboration and network topologies are diversified.

5. Wireless access stations are many. The number of users is great. The collaboration difficulty is great. The centralized management overhead is great.

6. Applications are many. Many services such as Machine to Machine (M2M) service and Vehicle to Vehicle (V2V) service may operate in unlicensed spectrums.

The above-mentioned basic features of the unlicensed spectrums decide that the utilization of the unlicensed spectrums may be an important evolution direction of wireless communication systems. However, at the same time, many problems also exist. For example, various wireless systems may exist in unlicensed spectrums, the wireless systems are difficult to coordinate and the interference is serious.

If LTE is deployed in unlicensed carriers, the control of unlicensed carriers still needs to be supported. Most countries require that a listen-before-talk mechanism needs to be supported when communication systems are deployed in unlicensed carriers. Interference caused to neighboring systems for a reason that the neighboring systems simultaneously use unlicensed carriers can be avoided through the listen-before-talk mechanism. Further, a contention mechanism is introduced, i.e., by introducing the contention mechanism to neighboring system stations (generally neighboring stations of the same system), interference caused by a reason that neighboring stations of the same system simultaneously use unlicensed carriers can be avoided.

For an LTE system, when contention is performed in a designed contention window, a base station of LTE may successfully contend for an unlicensed carrier resource at any moment of LTE. In other words, most moments, at which the base station of LTE successfully contends a right to use the unlicensed carrier resource, are not aligned to a start of a subframe of the LTE system, and the base station at most time obtains the right to use the unlicensed carrier at a moment in the middle of a subframe. However, according to the scheduling mechanism of the LTE system, the moment of scheduling always takes subframe as unit and consequently partial incomplete subframes are produced. In order to ensure that the base station can directly use the partial incomplete subframes, the problems how a receiving end rapidly finds that the base station successfully contends for the unlicensed carrier and how the complexity and energy consumption are reduced in a finding process need to be solved.

SUMMARY

The following is a summary of the subject described in detail in this text. The summary is not used for limiting the protection scope of claims.

The embodiment of the present disclosure provides a method and an apparatus for sending and receiving unlicensed carrier information. In a process of contending for a right to use an unlicensed carrier, by sending and receiving relevant information of the unlicensed carrier, a receiving end can be enabled to rapidly find that a base station to which the receiving end belongs obtains the right to use the unlicensed carrier, the complexity is low, the power consumption is small and thereby subsequent partial incomplete subframe resources can be utilized.

A method for sending unlicensed carrier information, applied to a base station, includes: sending unlicensed carrier information, herein the unlicensed carrier information includes one or more pieces of the following information: information about a start point of a contention backoff window and information about a backoff moment in the contention backoff window.

In an exemplary embodiment, the base station describes the information about the backoff moment in the contention backoff window through a bit in DCI and sends the DCI in a PDCCH or an ePDCCH.

In an exemplary embodiment, the start point of the contention backoff window refers to start time of a contention backoff window for contending for an unlicensed carrier at a single time.

In an exemplary embodiment, the information about the start point of the contention backoff window includes a subframe number and a frame number of subframe corresponding to a position of the start point of the contention backoff window, herein the arrangement of the subframe number and the frame number is consistent with the arrangement of a subframe number and a frame number of a licensed carrier corresponding to the unlicensed carrier.

In an exemplary embodiment, when no monitoring for a fixed time length is performed before the contention backoff window, a start point of a subframe corresponding to the subframe number and the frame number is the start point of the contention backoff window. Or an end point of a subframe corresponding to the subframe number and the frame number is the start point of the contention backoff window.

In an exemplary embodiment, when monitoring for a fixed time length is performed before the contention backoff window, the start point of the contention backoff window is an end point of the fixed time length, and a start point of a subframe corresponding to the subframe number and the frame number is a start point of the fixed time length. Or an end point of a subframe corresponding to the subframe number and the frame number is a start point of the fixed time length.

In an exemplary embodiment, the information about the start point of the contention backoff window further includes a serial number of a start OFDM symbol corresponding to the position of the start point of the contention backoff window.

In an exemplary embodiment, the OFDM symbol corresponding to the position of the start point of the contention backoff window is a kth OFDM symbol after a Physical Downlink Control Channel PDCCH, herein k is an integer greater than or equal to 1.

In an exemplary embodiment, the above-mentioned method further includes the following steps.

Monitoring is performed to the unlicensed carrier before the contention backoff moment, and it is confirmed that the base station obtains a right to use the unlicensed carrier if a monitoring result is that the unlicensed carrier is idle when the contention backoff moment is reached. And monitoring is suspended if a monitoring result is that the unlicensed carrier is busy before the contention backoff moment is reached, a moment corresponding to a suspending moment is recorded and it is confirmed that contention for the unlicensed carrier at a current time fails.

In an exemplary embodiment, the unlicensed carrier information further includes unlicensed carrier configuration information, and the unlicensed carrier configuration information includes one or more of the following: unlicensed carrier frequency point, bandwidth and serial number of unlicensed carrier.

Once the base station successfully contends for a right to use the unlicensed carrier described in the unlicensed carrier configuration information, the unlicensed carrier is an auxiliary component carrier which is configured by the base station for a receiving end and is in an activated state. And if the base station does not successfully contend for the right to use the unlicensed carrier, the unlicensed carrier configuration information is not effective to the receiving end.

In an exemplary example, the unlicensed carrier information is sent in a licensed carrier through an RRC message, or the unlicensed carrier information is described through a bit in DCI and the DCI is sent through a PDCCH or an ePDCCH of a licensed carrier.

A method for receiving unlicensed carrier information, applied to a receiving end, includes the following step.

Unlicensed carrier information sent by a sending end is received, herein the unlicensed carrier information includes one or more pieces of the following information: information about a start point of a contention backoff window and information about a backoff moment in the contention backoff window.

In an exemplary example, receiving the unlicensed carrier information sent by the sending end includes receiving DCI in a PDCCH or an ePDCCH, and a bit in the DCI describes the information about the backoff moment in the contention backoff window.

In an exemplary example, the start point of the contention backoff window refers to start time of a contention backoff window for contending for an unlicensed carrier at a single time.

In an exemplary example, the information about the start point of the contention backoff window includes a subframe number and a frame number of subframe corresponding to a position of the start point of the contention backoff window, herein the arrangement of the subframe number and the frame number is consistent with the arrangement of a subframe number and a frame number of a licensed carrier corresponding to the unlicensed carrier.

In an exemplary embodiment, when no monitoring for a fixed time length is performed before the contention backoff window, a start point of a subframe corresponding to the subframe number and the frame number is the start point of the contention backoff window. Or an end point of a subframe corresponding to the subframe number and the frame number is the start point of the contention backoff window.

In an exemplary embodiment, when monitoring for a fixed time length is performed before the contention backoff window, the start point of the contention backoff window is an end point of the fixed time length, and a start point of a subframe corresponding to the subframe number and the frame number is a start point of the fixed time length. Or an end point of a subframe corresponding to the subframe number and the frame number is a start point of the fixed time length.

In an exemplary embodiment, the information about the start point of the contention backoff window further includes a serial number of a start OFDM symbol corresponding to the position of the start point of the contention backoff window.

In an exemplary embodiment, the OFDM symbol corresponding to the position of the start point of the contention backoff window is a kth OFDM symbol after a Physical Downlink Control Channel PDCCH, herein k is an integer greater than or equal to 1.

In an exemplary embodiment, the unlicensed carrier information further includes unlicensed carrier configuration information, and the unlicensed carrier configuration information includes one or more of the following: unlicensed carrier frequency point, bandwidth and serial number of unlicensed carrier.

In an exemplary embodiment, the receiving end receives an RRC message in a licensed carrier and the RRC message carries the unlicensed carrier information, or the receiving end receives DCI in a PDCCH or an ePDCCH of a licensed carrier and a bit in the DCI describes the unlicensed carrier information.

An apparatus for sending unlicensed carrier information, applied to a base station, includes the following modules.

a sending module is arranged to send unlicensed carrier information, herein the unlicensed carrier information includes one or more pieces of the following information: information about a start point of a contention backoff window and information about a backoff moment in the contention backoff window.

In an exemplary embodiment, the sending module describes the information about the backoff moment in the contention backoff window through a bit in DCI and sends the DCI in a PDCCH or an ePDCCH.

In an exemplary embodiment, the start point of the contention backoff window refers to start time of a contention backoff window for contending for an unlicensed carrier at a single time.

In an exemplary embodiment, the information about the start point of the contention backoff window includes a subframe number and a frame number of subframe corresponding to a position of the start point of the contention backoff window, herein the arrangement of the subframe number and the frame number is consistent with the arrangement of a subframe number and a frame number of a licensed carrier corresponding to the unlicensed carrier.

In an exemplary embodiment, when no monitoring for a fixed time length is performed before the contention backoff window, a start point of a subframe corresponding to the subframe number and the frame number is the start point of the contention backoff window. Or an end point of a subframe corresponding to the subframe number and the frame number is the start point of the contention backoff window.

In an exemplary embodiment, when monitoring for a fixed time length is performed before the contention backoff window, the start point of the contention backoff window is an end point of the fixed time length, and a start point of a subframe corresponding to the subframe number and the frame number is a start point of the fixed time length. Or an end point of a subframe corresponding to the subframe number and the frame number is a start point of the fixed time length.

In an exemplary embodiment, the information about the start point of the contention backoff window further includes a serial number of a start OFDM symbol corresponding to the position of the start point of the contention backoff window.

In an exemplary embodiment, the OFDM symbol corresponding to the position of the start point of the contention backoff window is a kth OFDM symbol after a Physical Downlink Control Channel PDCCH, herein k is an integer greater than or equal to 1.

In an exemplary embodiment, the apparatus further includes the following module.

A monitoring module is arranged to perform monitoring to the unlicensed carrier before the contention backoff moment, and confirm that the base station obtains a right to use the unlicensed carrier if a monitoring result is that the unlicensed carrier is idle when the contention backoff moment is reached. And monitoring is suspended if a monitoring result is that the unlicensed carrier is busy before the contention backoff moment is reached and a moment corresponding to a suspending moment is recorded and that contention for the unlicensed carrier at a current time fails is confirmed.

In an exemplary embodiment, the unlicensed carrier information further includes unlicensed carrier configuration information, and the unlicensed carrier configuration information includes one or more of the following: unlicensed carrier frequency point, bandwidth and serial number of unlicensed carrier.

Once the base station successfully contends for a right to use the unlicensed carrier described in the unlicensed carrier configuration information, the unlicensed carrier is an auxiliary component carrier which is configured by the base station for a receiving end and is in an activated state. And if the base station does not successfully contend for the right to use the unlicensed carrier, the unlicensed carrier configuration information is not effective to the receiving end.

In an exemplary embodiment, the sending module sends the unlicensed carrier information in a licensed carrier through an RRC message, or describes the unlicensed carrier information through a bit in DCI and sends the DCI through a PDCCH or an ePDCCH of a licensed carrier.

An apparatus for receiving unlicensed carrier information, applied to a receiving end, includes the following module.

A receiving module is arranged to receive unlicensed carrier information sent by a sending end, herein the unlicensed carrier information includes one or more pieces of the following information: information about a start point of a contention backoff window and information about a backoff moment in the contention backoff window.

In an exemplary embodiment, the receiving module receives DCI in a PDCCH or an ePDCCH, and a bit in the DCI describes the information about the backoff moment in the contention backoff window.

In an exemplary embodiment, the start point of the contention backoff window refers to start time of a contention backoff window for contending for an unlicensed carrier at a single time.

In an exemplary embodiment, the information about the start point of the contention backoff window includes a subframe number and a frame number of subframe corresponding to a position of the start point of the contention backoff window, herein the arrangement of the subframe number and the frame number is consistent with the arrangement of a subframe number and a frame number of a licensed carrier corresponding to the unlicensed carrier.

In an exemplary embodiment, when no monitoring for a fixed time length is performed before the contention backoff window, a start point of a subframe corresponding to the subframe number and the frame number is the start point of the contention backoff window; or an end point of a subframe corresponding to the subframe number and the frame number is the start point of the contention backoff window.

In an exemplary embodiment, when monitoring for a fixed time length is performed before the contention backoff window, the start point of the contention backoff window is an end point of the fixed time length, and a start point of a subframe corresponding to the subframe number and the frame number is a start point of the fixed time length. Or an end point of a subframe corresponding to the subframe number and the frame number is a start point of the fixed time length.

In an exemplary embodiment, the information about the start point of the contention backoff window further includes a serial number of a start OFDM symbol corresponding to the position of the start point of the contention backoff window.

In an exemplary embodiment, the OFDM symbol corresponding to the position of the start point of the contention backoff window is a kth OFDM symbol after a Physical Downlink Control Channel PDCCH, herein k is an integer greater than or equal to 1.

In an exemplary embodiment, the unlicensed carrier information further includes unlicensed carrier configuration information, and the unlicensed carrier configuration information includes one or more of the following: unlicensed carrier frequency point, bandwidth and serial number of unlicensed carrier.

In an exemplary embodiment, the receiving module receives an RRC message in a licensed carrier and the RRC message carries the unlicensed carrier information, or the receiving module receives DCI in a PDCCH or an ePDCCH of a licensed carrier and a bit in the DCI describes the unlicensed carrier information.

The embodiment of the present disclosure further provides a computer-readable storage medium, storing computer-executable instructions used for executing the above-mentioned methods.

According to the embodiment of the present disclosure, in a process of contending for a right to use an unlicensed carrier, by sending and receiving relevant information of the unlicensed carrier, a receiving end can be enabled to rapidly find that a base station to which the receiving end belongs obtains the right to use the unlicensed carrier, the complexity is low, the power consumption is small and thereby subsequent partial incomplete subframe resources can be utilized.

Other aspects can be understood after the drawings and the detailed description are read and understood.

SPECIFIC EMBODIMENTS

Figure 1:
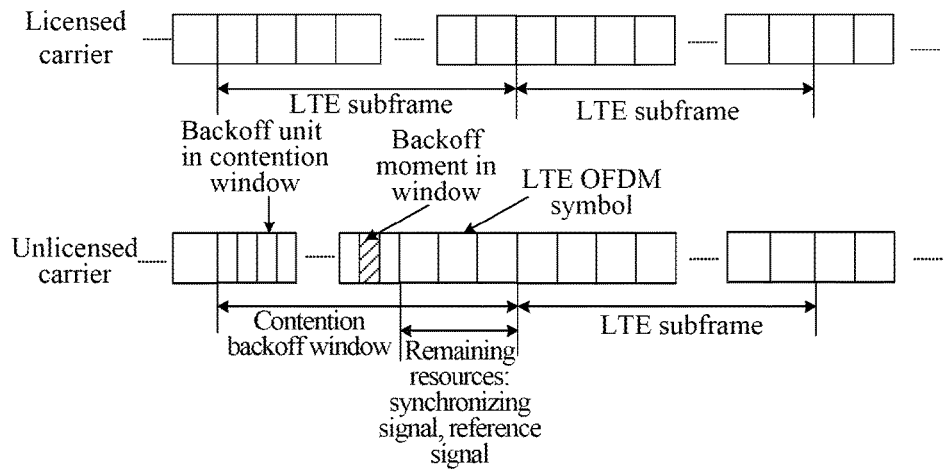
FIG. 1 illustrates a schematic diagram of utilization of an unlicensed carrier resource according to embodiment 1.

The technical solution of the present disclosure will be described below in more detail with reference to the drawings in combination with the embodiments.

It shall be illustrated that the embodiments of the present disclosure and the features in the embodiments may be mutually combined under the situation of no conflict, and any combination is included in the protection scope of the present disclosure.

The embodiment of the present disclosure provides a method for sending unlicensed carrier information, and a base station, before contending for an unlicensed carrier, sends one or more pieces of the following information related to the unlicensed carrier to a receiving end (e.g., UE): a start point of a contention backoff window and a backoff moment in the contention backoff window. Herein, the information related to the unlicensed carrier may be sent through a licensed carrier. The unlicensed carrier information may further include unlicensed carrier configuration information. When unlicensed carriers supported by the UE and the base station are the same and fall into a unique set (the number of included unlicensed carriers is small), the unlicensed carrier configuration information may not be sent, and the unlicensed carrier configuration information may be always defaulted to be configured on UE and base station sides, and is frequency point configuration information of unlicensed carriers in the unique set.

In an exemplary embodiment, the base station describes the information about the backoff moment in the contention backoff window through a bit in DCI and sends the DCI in a PDCCH or an ePDCCH.

In an exemplary embodiment, the start point of the contention backoff window refers to start time of a contention backoff window for contending for an unlicensed carrier at a single time.

In an exemplary embodiment, the information about the start point of the contention backoff window includes a subframe number and a frame number of subframe corresponding to a position of the start point of the contention backoff window, herein the arrangement of the subframe number and the frame number is consistent with the arrangement of a subframe number and a frame number of a licensed carrier corresponding to the unlicensed carrier.

In an exemplary embodiment, when no monitoring for a fixed time length is performed before the contention backoff window, a start point of a subframe corresponding to the subframe number and the frame number is the start point of the contention backoff window. Or an end point of a subframe corresponding to the subframe number and the frame number is the start point of the contention backoff window.

In an exemplary embodiment, when monitoring for a fixed time length is performed before the contention backoff window, the start point of the contention backoff window is an end point of the fixed time length, and a start point of a subframe corresponding to the subframe number and the frame number is a start point of the fixed time length. Or an end point of a subframe corresponding to the subframe number and the frame number is a start point of the fixed time length.

In an exemplary embodiment, the information about the start point of the contention backoff window further includes a serial number of a start OFDM symbol corresponding to the position of the start point of the contention backoff window.

In an exemplary embodiment, the OFDM symbol corresponding to the position of the start point of the contention backoff window is a kth OFDM symbol after a Physical Downlink Control Channel PDCCH, herein k is an integer greater than or equal to 1.

In an exemplary embodiment, the method further includes the following step.

Monitoring to the unlicensed carrier before the contention backoff moment is performed, and that the base station obtains a right to use the unlicensed carrier is confirmed if a monitoring result is that the unlicensed carrier is idle when the contention backoff moment is reached. And monitoring is suspended if a monitoring result is that the unlicensed carrier is busy before the contention backoff moment is reached, a moment corresponding to a suspending moment is recorded and that contention for the unlicensed carrier at a current time fails is confirmed.

In an exemplary embodiment, the unlicensed carrier configuration information includes one or more of the following: unlicensed carrier frequency point, bandwidth and serial number of unlicensed carrier.

Once the base station successfully contends for a right to use the unlicensed carrier described in the unlicensed carrier configuration information, the unlicensed carrier is an auxiliary component carrier which is configured by the base station for a receiving end and is in an activated state. And if the base station does not successfully contend for the right to use the unlicensed carrier, the unlicensed carrier configuration information is not effective to the receiving end.

In an exemplary embodiment, the unlicensed carrier information is sent in a licensed carrier through an RRC message, or the unlicensed carrier information is described through a bit in DCI and the DCI is sent through a PDCCH or an ePDCCH of a licensed carrier.

Correspondingly, the embodiment of the present disclosure further provides an apparatus for sending unlicensed carrier information, applied to a base station, including the following module.

A sending module is arranged to send unlicensed carrier information, herein the unlicensed carrier information includes one or more pieces of the following information:

information about a start point of a contention backoff window and information about a backoff moment in the contention backoff window.

The apparatus may further include the following module.

A monitoring module is arranged to perform monitoring to the unlicensed carrier before the contention backoff moment, and confirm that the base station obtains a right to use the unlicensed carrier if a monitoring result is that the unlicensed carrier is idle when the contention backoff moment is reached And monitoring is suspended, if a monitoring result is that the unlicensed carrier is busy before the contention backoff moment is reached, a moment corresponding to a suspending moment is recorded and that contention for the unlicensed carrier at a current time fails is confirmed.

After the base station preempts an unlicensed carrier in a contention backoff window, the base station may utilize the unlicensed carrier to send one or more of the following signals in remaining resources in the contention backoff window and subframes after the remaining resources: start symbol identification information, synchronizing signal, reference signal and service data signal (i.e., PDSCH of LTE, including a system broadcasting message). The remaining resources include complete Orthogonal Frequency Division Multiplexing OFDM symbols in the contention backoff window and after a moment that a right to use the unlicensed carrier is successfully contended, or complete OFDM symbols between a moment that the base station successfully contends for the right to use the unlicensed carrier and an end moment of a subframe in which the moment is located. Herein, in the unlicensed carrier, if the base station sends service data in a subframe corresponding to the moment that the base station successfully contends for the unlicensed carrier, the base station sends control information corresponding to the service data in a licensed carrier, and a time domain position of the control information is in a next subframe of a subframe corresponding to the moment that the base station successfully contends for the unlicensed carrier. And the base station may also send the control information in the unlicensed carrier, and the time domain position of the control information is in a next subframe of a subframe corresponding to the moment that the base station successfully contends for the unlicensed carrier.

In an exemplary embodiment, if the information related to the unlicensed carrier and sent by the base station does not include the backoff moment in the contention backoff window, the base station contains the backoff moment in the contention backoff window in the control information, or the control information includes equivalent information with the same function as the backoff moment in the contention backoff window. The equivalent information includes LTE OFDM symbol position information which describes that the base station sends data in a subframe corresponding to the moment that the unlicensed carrier is contended. Or the LTE OFDM symbol position information is a serial number of an LTE OFDM symbol which is arranged from an end moment of the subframe to the moment that the base station successfully contends for the unlicensed carrier; or the LTE OFDM symbol position information is a serial number of an LTE OFDM symbol which is arranged from a start moment of the subframe to an end moment of the subframe.

In an exemplary embodiment, the operation that the base station sends unlicensed frequency point information refers to that the base station sends an unlicensed carrier frequency point to be contended by the base station to subordinate UE and configures the unlicensed carrier to the UE. Similarly, the UE also considers that the unlicensed carrier frequency point sent by the base station is the unlicensed carrier frequency point configured by the base station for the UE. By adopting such default configuration, the existing carrier configuration and activation process in carrier aggregation of LTE can be avoided. The time spent in the existing carrier configuration and activation process is comparatively long, and it is not suitable for the configuration of unlicensed carriers (since the use time of the unlicensed carrier which is contended at one time is too short, the existing mechanism cannot be adopted to perform carrier configuration and activation).

In an exemplary embodiment, the start time of the contention backoff window includes the start time of the contention backoff window which is directly described, or the start time of the contention backoff window which is indirectly described through a known time length. For example, the start point of the contention backoff window is described according to a description mode through a frame number and a subframe number, including that firstly a frame number of a frame in which the start point of the contention backoff window is located is described and given, and then a subframe number in the frame is given. Herein, the arrangement of the subframe number and the frame number is consistent with the arrangement of a subframe number and a frame number of a licensed carrier corresponding to the unlicensed carrier.

In an exemplary embodiment, if no monitoring for a fixed time length (a fixed time length is set, the base station needs to perform monitoring within the time length, the contention backoff window is continuously entered if a monitoring result is that the unlicensed carrier is idle, and a subsequent action is stopped if a monitoring result is that the unlicensed carrier is not idle) is performed before the contention backoff window, the description of the frame number and the subframe number which describe the start point of the contention backoff window includes that: the start point of the contention backoff window is located at a start point of a subframe, i.e., the start point of the subframe is used as the start point of the contention backoff window. The start point of the subframe which is described by the frame number and the subframe number is the start point of the contention backoff window. Or the start point of the contention backoff window is located at an end point of a subframe, i.e., the end point of the subframe is used as the start point of the contention backoff window. The end point of the subframe which is described by the frame number and the subframe number is the start point of the contention backoff window.

In an exemplary embodiment, if monitoring for a fixed time length is performed closely before the contention backoff window, the start point of the contention backoff window is an end point of the fixed time length. The description of the frame number and the subframe number which describe the start point of the contention backoff window includes that: a start point of the fixed time length is located at a start point of a subframe, i.e., the start point of the subframe is used as the start point of the fixed time length. The start point of the subframe which is described by the frame number and the subframe number is the start point of the fixed time length; or the start point of the fixed time length is located at an end point of a subframe, i.e., the end point of the subframe is used as the start point of the fixed time length. The end point of the subframe which is described by the frame number and the subframe number is the start point of the fixed time length. With respect to the foresaid description, in the description of the start point of the contention backoff window, a description mode through an LTE OFDM symbol may also be added, including that:

firstly a frame number of a frame in which the start point of the contention backoff window is located is described and given, then a subframe number in the frame is given and finally an LTE OFDM symbol in the subframe is given, herein the arrangement of the frame number and the subframe number is consistent with the arrangement of a frame number and a subframe number of a licensed carrier corresponding to the unlicensed carrier. Herein, the LTE OFDM symbol corresponding to the start point may be preset to be a fixed value, such that signal transmission is omitted, and it may also be notified through signaling. Herein, the LTE OFDM symbol corresponding to the start point is a Kth LTE OFDM symbol after a PDCCD, K is an integer within 1-13 and is alternatively 1 or 2, and when K is 2, the first OFDM symbol is reserved for monitoring. And in an exemplary embodiment, the number of OFDM symbols occupied by the PDCCH is fixed.

In an exemplary embodiment, the contention backoff moment refers to the backoff moment in the contention backoff window produced by the base station when the base station participates in contending for the unlicensed carrier, the base station performs monitoring to the unlicensed carrier before the moment, and the base station considers that the base station obtains the unlicensed carrier if a result of monitoring performed by the base station is that the carrier is idle when the moment is reached. And the base station suspends monitoring if a result of monitoring performed by the base station before the moment is reached is that the unlicensed carrier is busy, a moment corresponding to a suspending moment is recorded and that the base station fails to contend for the unlicensed carrier at a current time is considered.

In an exemplary embodiment, after the base station preempts the unlicensed carrier in the contention window, the base station, starting from the moment that the right to use the unlicensed carrier is obtained, confirms positions of LTE OFDM symbols corresponding to remaining time in the subframe, and thereafter sends signals/data by using the LTE OFDM symbols. The operation of determining the positions of the LTE OFDM symbols corresponding to the remaining time includes that: OFDM symbols are placed according to an LTE OFDM symbol time length from the end point of the subframe to the time point that the base station successfully contends for the unlicensed carrier till a complete OFDM symbol cannot be arranged, and at this moment complete OFDM symbols after the time point are used for sending signals.

In an exemplary embodiment, the position and/or sequence of the LTE OFDM symbol for sending the synchronizing signal is agreed between the base station and the UE in advance. Herein, the time domain position for sending the synchronizing signal is as follows. it is sent starting from first two LTE OFDM symbols after the base station successfully contends for the unlicensed carrier. Or it is sent starting from a next subframe of a subframe when the base station successfully contends for the unlicensed carrier. Or it is sent starting from a next subframe of a frame when the base station successfully contends for the unlicensed carrier and periodically sending or sending for predetermined times.

In an exemplary embodiment, when the synchronizing signal is an LTE PSS/SSS signal, as agreed between the base station and the subordinate UE, a sequence of the synchronizing signal sent by the base station in the contended unlicensed carrier is the same as a sequence of a PSS/SSS of a licensed carrier corresponding to the unlicensed carrier, or the sequence of the PSS/SSS is indicated in the configuration information sent in the licensed carrier.

In an exemplary embodiment, the synchronizing signal is used by the base station for identifying the position of the LTE OFDM symbol, at which the base station successfully contends for the unlicensed carrier and sends data in the unlicensed carrier, and for example, it may be a start LTE OFDM symbol which identifies that the base statin sends data.

In an exemplary embodiment, the reference signal includes one or more of CRS, PRS, CSI-RS and SRS. The time domain position for sending the reference signal is as follows it is sent only starting from a first LTE OFDM symbol after the base station successfully contends for the unlicensed carrier, and it is sent in at least one complete LTE subframe, e.g., it is sent in a next complete subframe of a subframe corresponding to the moment that the base station successfully contends for the unlicensed carrier. Or it is periodically sent starting from a subframe when the base station successfully contends for the unlicensed carrier. Or it is sent for predetermined times starting from a subframe when the base station successfully contends for the unlicensed carrier.

In an exemplary embodiment, after the base station successfully contends for the unlicensed carrier, the base station sends a synchronizing signal and/or reference signal in the unlicensed carrier to imply the information about a time length that the base station occupies the unlicensed carrier at a current time. The operation that the synchronizing signal and the reference signal imply the information about the time length that the base station occupies the unlicensed carrier at the current time includes that: it is agreed that different sequences of synchronizing signals and/or reference signals represent different occupation time lengths.

In an exemplary embodiment, after the base station obtains the right to use the unlicensed carrier, the base station immediately sends a reference signal, herein when the reference signal includes CSI-RS, at this moment the CSI-RS sent by the base station is sent according to the CSI-RS configuration agreed with the UE in advance, or according to the CSI-RS configuration notified by the base station through a licensed carrier in advance. The base station sends the CSI-RS in an LTE OFDM symbol in a subframe when the unlicensed carrier is successfully contended, or the base station sends the CSI-RS starting from a next subframe of a subframe when the unlicensed carrier is successfully contended.

In an exemplary embodiment, before the base station successfully contends for the unlicensed carrier, the base station notifies the UE about one or more of position, period and sequence for the base station to send the synchronizing signal after the base station successfully contends for the unlicensed carrier. And one or more of type, port and period for the base station of the reference signal are sent after the base station successfully contends for the unlicensed carrier. Herein, the synchronizing signal is sent in the subframe when the base station obtains the right to use the unlicensed carrier, the period of the synchronizing signal is a period of sending the synchronizing signal in the time of the unlicensed carrier occupied at the current time, and the sequence of the synchronizing signal is selected by the base station from a given synchronizing sequence set which is used for describing information about a time length that the base station occupies the unlicensed carrier.

In an exemplary embodiment, after the base station successfully contends for the unlicensed carrier, the moment that the unlicensed carrier is successfully contended is used as a start point of subframes, subframes are divided backwards from the start point, and signals are sent in a first LTE OFDM symbol of a first subframe obtained after division.

The embodiment further provides a method for receiving unlicensed carrier information. A receiving end (e.g., UE) receives unlicensed carrier information sent by a sending end (e.g., a base station), herein the unlicensed carrier information includes a start point of a contention backoff window and/or a backoff moment in the contention backoff window.

In an exemplary embodiment, receiving the unlicensed carrier information sent by the sending end includes receiving DCI in a PDCCH or an ePDCCH, and a bit in the DCI describes the information about the backoff moment in the contention backoff window.

In an exemplary embodiment, the start point of the contention backoff window refers to start time of a contention backoff window for contending for an unlicensed carrier at a single time.

In an exemplary embodiment, the information about the start point of the contention backoff window includes a subframe number and a frame number of subframe corresponding to a position of the start point of the contention backoff window, herein the arrangement of the subframe number and the frame number is consistent with the arrangement of a subframe number and a frame number of a licensed carrier corresponding to the unlicensed carrier.

In an exemplary embodiment, when no monitoring for a fixed time length is performed before the contention backoff window, a start point of a subframe corresponding to the subframe number and the frame number is the start point of the contention backoff window. Or an end point of a subframe corresponding to the subframe number and the frame number is the start point of the contention backoff window.

In an exemplary embodiment, when monitoring for a fixed time length is performed before the contention backoff window, the start point of the contention backoff window is an end point of the fixed time length, and a start point of a subframe corresponding to the subframe number and the frame number is a start point of the fixed time length. Or an end point of a subframe corresponding to the subframe number and the frame number is a start point of the fixed time length.

In an exemplary embodiment, the information about the start point of the contention backoff window further includes a serial number of a start OFDM symbol corresponding to the position of the start point of the contention backoff window.

In an exemplary embodiment, the OFDM symbol corresponding to the position of the start point of the contention backoff window is a kth OFDM symbol after a Physical Downlink Control Channel PDCCH, herein k is an integer greater than or equal to 1.

In an exemplary embodiment, the unlicensed carrier information further includes unlicensed carrier configuration information, and the unlicensed carrier configuration information includes one or more of the following: unlicensed carrier frequency point, bandwidth and serial number of unlicensed carrier.

In an exemplary embodiment, the receiving end receives an RRC message in a licensed carrier and the RRC message carries the unlicensed carrier information, or the receiving end receives DCI in a PDCCH or an ePDCCH of a licensed carrier and a bit in the DCI describes the unlicensed carrier information.

Correspondingly, the embodiment of the present disclosure further provides an apparatus for receiving unlicensed carrier information, applied to a receiving end, including the following module.

A receiving module is arranged to receive unlicensed carrier information sent by a sending end, herein the unlicensed carrier information includes one or more pieces of the following information: information about a start point of a contention backoff window and information about a backoff moment in the contention backoff window.

The receiving end may judges whether the sending end obtains a right to use the unlicensed carrier according to the unlicensed carrier information. If it is judged that the base station obtains the right to use the unlicensed carrier, the unlicensed carrier information is utilized for receiving signals sent by the base station by using remaining resources in the contention backoff window and/or subframes after the remaining resources, herein the remaining resources include complete Orthogonal Frequency Division Multiplexing OFDM symbols in the contention backoff window and after a moment that a right to use the unlicensed carrier is successfully contended, or complete OFDM symbols between a moment that the base station successfully contends for the right to use the unlicensed carrier and an end moment of a subframe in which the moment is located. Herein, the unlicensed carrier information includes one or more of the following: unlicensed carrier frequency point configuration information, a start point of a contention backoff window and a backoff moment in the contention backoff window. Herein, the signals include one or more of the following: start symbol identification information, synchronizing signal, reference signal and service data signal (i.e., LTE PDSCH data, including a system broadcasting message). The signals may all be in corresponding configuration information. Herein, if the UE receives the service data from the unlicensed carrier, control information corresponding to the service data is received in a licensed carrier, and the control information is received in a next subframe of a subframe corresponding to the contended unlicensed carrier, and the UE may also receive the control information in the unlicensed carrier (the base station may also send the control information in the unlicensed carrier), and the time domain position of the control information is in a next subframe of a subframe corresponding to the moment that the base station successfully contends for the unlicensed carrier.

Herein, if unlicensed carrier information received by the UE does not include the backoff moment in the contention backoff window, the UE obtains the backoff moment in the contention backoff window from the control information, or the UE obtains equivalent information of the backoff moment in the contention backoff window from the control information. The equivalent information includes LTE OFDM symbol position information which describes that the base station sends data in a subframe of the contended unlicensed carrier. It includes that the LTE OFDM symbol position information is a serial number of an LTE OFDM symbol which is arranged from an end moment of the subframe to the moment that the base station successfully contends for the unlicensed carrier. Or it includes that the LTE OFDM symbol position information is a serial number of an LTE OFDM symbol which is arranged from a start moment of the subframe to an end moment of the subframe.

In an exemplary embodiment, the UE receives an unlicensed carrier frequency point which is sent by the base station to which the UE belongs and is to be contended by the base station, and the UE considers that the unlicensed carrier is configured to the UE itself.

In an exemplary embodiment, the start point of the contention backoff window refers to start time of a contention backoff window for the base station to contend for an unlicensed carrier at a single time. Herein, the start time of the contention backoff window includes the start time of the contention backoff window which is directly described, or the start time of the contention backoff window which is indirectly described through a known time length.

In an exemplary embodiment, the start point of the contention backoff window is described according to a description mode through a frame number and a subframe number, firstly a frame number of a frame in which the start point of the contention backoff window is located is described and given, and then a subframe number in the frame is given. Herein, the arrangement of the subframe number and the frame number is consistent with the arrangement of a subframe number and a frame number of a licensed carrier corresponding to the unlicensed carrier.

In an exemplary embodiment, if no monitoring for a fixed time length is performed before the contention backoff window, the description of the frame number and the subframe number which describe the start point of the contention backoff window includes the following point. The start point of the contention backoff window is located at a start point of a subframe, i.e., the start point of the subframe is used as the start point of the contention backoff window, and the start point of the subframe which is described by the frame number and the subframe number is the start point of the contention backoff window. Or the start point of the contention backoff window is located at an end point of a subframe, i.e., the end point of the subframe is used as the start point of the contention backoff window. The end point of the subframe which is described by the frame number and the subframe number is the start point of the contention backoff window.

In an exemplary embodiment, if monitoring for a fixed time length is performed closely before the contention backoff window, the start point of the contention backoff window becomes an end point of the fixed time length. The description of the frame number and the subframe number which describe the start point of the contention backoff window includes that the following points. A start point of the fixed time length is located at a start point of a subframe, i.e., the start point of the subframe is used as the start point of the fixed time length. The start point of the subframe which is described by the frame number and the subframe number is the start point of the fixed time length. Or the start point of the fixed time length is located at an end point of a subframe, i.e., the end point of the subframe is used as the start point of the fixed time length. The end point of the subframe which is described by the frame number and the subframe number is the end point of the fixed time length.

In an exemplary embodiment, for the start point of the contention backoff window, a description mode through an LTE OFDM symbol may also be added, including the following steps. Firstly a frame number of a frame in which the start point of the contention backoff window is located is described and given, then a subframe number in the frame is given and finally an LTE OFDM symbol in the subframe is given, herein the frame number and the subframe number are arranged according to a frame number and a subframe number of a licensed carrier corresponding to the unlicensed carrier. Herein, the LTE OFDM symbol corresponding to the start point may be preset to be a fixed value, such that signal transmission is omitted. Or the LTE OFDM symbol corresponding to the start point is a Kth LTE OFDM symbol after a PDCCD, K is an integer within 1-13 and is alternatively 1 or 2, and when K is 1, the first OFDM symbol contains the fixed time length for monitoring, followed by the start point of the contention backoff window, or the first OFDM symbol does not contain the fixed time length for monitoring and a start moment of the first OFDM symbol is the start point of the contention backoff window. In addition, alternatively, the number of OFDM symbols occupied by the PDCCH is fixed. In the PDCCH, the base station can send PHICH information to the UE.

In an exemplary embodiment, the contention backoff moment refers to the backoff moment in the contention backoff window produced by the base station when the base station participates in contending for the unlicensed carrier, the base station performs monitoring to the unlicensed carrier before the moment, and the base station considers that the base station obtains the unlicensed carrier if a result of monitoring performed by the base station is that the carrier is idle when the moment is reached. And the base station suspends monitoring if a result of monitoring performed by the base station before the moment is reached is that the unlicensed carrier is busy, and the base station records a moment corresponding to a suspending moment and considers that the base station fails to contend for the unlicensed carrier at a current time.

In an exemplary embodiment, the UE judges whether the base station to which the UE belongs obtains the right to use the unlicensed carrier, including that the UE makes a judgment according to whether the base station sends relevant signals/data, herein the position for sending the signals/data is as follow. After the base station to which the UE belongs preempts the unlicensed carrier, the base station, starting from the moment that the right to use the unlicensed carrier is obtained, confirms positions of LTE OFDM symbols corresponding to remaining time in the subframe, and thereafter sends signals/data by using the LTE OFDM symbols. The operation of determining the positions of the LTE OFDM symbols corresponding to the remaining time includes the following operations. OFDM symbols are placed according to an LTE OFDM symbol time length from the end point of the present subframe to the time point that the base station successfully contends for the unlicensed carrier till a complete OFDM symbol cannot be arranged, and at this moment complete OFDM symbols after the time point are used for sending signals.

In an exemplary embodiment, the position and/or sequence of the LTE OFDM symbol for sending the synchronizing signal is agreed between the UE and the base station in advance. Herein, the synchronizing signal is received in first two LTE OFDM symbols only after the base station successfully contends for the unlicensed carrier. Or the synchronizing signal is received starting from a next subframe of a subframe when the base station successfully contends for the unlicensed carrier. Or the synchronizing signal is periodically received starting from a next subframe of a subframe when the base station successfully preempts the unlicensed carrier or the synchronizing signal is received for predetermined times in the time that the base station occupies the unlicensed carrier.

In an exemplary embodiment, when the synchronizing signal is a PSS/SSS signal, as agreed between the UE and the base station to which the UE belongs, a sequence of the synchronizing signal received by the UE in the unlicensed carrier successfully contended by the base station is the same as a sequence of a PSS/SSS of a licensed carrier corresponding to the unlicensed carrier, or the sequence of the PSS/SSS is acquired by the UE from the configuration information in the licensed carrier.

In an exemplary embodiment, the UE learns about the position of the LTE OFDM symbol, at which the base station to which the UE belongs successfully contends for the unlicensed carrier and sends data in the unlicensed carrier, through the synchronizing signal. In an exemplary embodiment, the UE considers that the base station to which the UE belongs sends the synchronizing signal in the start LTE OFDM symbol in the occupied unlicensed carrier.

In an exemplary embodiment, the reference signal includes one or more of CRS, PRS, CSI-RS and SRS. The time domain position for receiving the reference signal is as follows. It is received only starting from a first LTE OFDM symbol after the base station successfully contends for the unlicensed carrier, and it is sent in at least one complete LTE subframe. Or it is periodically received starting from a subframe when the base station successfully contends for the unlicensed carrier. Or it is received for predetermined times starting from a subframe when the base station successfully contends for the unlicensed carrier.

In an exemplary embodiment, the UE learns about information about a time length that the base station to which the UE belongs occupies the unlicensed carrier by receiving the synchronizing signal and/or reference signal sent in the unlicensed carrier. The operation that the UE learns about the information about the time length that the base station to which the UE belongs occupies the unlicensed carrier by receiving the synchronizing signal and/or reference signal sent in the unlicensed carrier includes that the following steps. The UE learns about the time length that the base station to which the UE belongs occupies the unlicensed carrier according to an agreement that different sequences of synchronizing signals and/or reference signals represent different occupation time lengths.

In an exemplary embodiment, the UE supposes that the base station immediately sends the reference signal after the base station obtains the right to use the unlicensed carrier, herein when the reference signal includes CSI-RS, at this moment the CSI-RS sent by the base station is sent according to the CSI-RS configuration agreed with the UE in advance, or according to the CSI-RS configuration notified by the base station through a licensed carrier in advance. The UE supposes that the base station sends the CSI-RS in an LTE OFDM symbol in a subframe when the unlicensed carrier is successfully contended, or the UE supposes that the base station sends the CSI-RS starting from a next subframe of a subframe when the unlicensed carrier is successfully contended.

In an exemplary embodiment, before the base station successfully contends for the unlicensed carrier, the base station notifies the UE about one or more of position, period and sequence for the base station to send the synchronizing signal after the base station successfully contends for the unlicensed carrier; and one or more of type, port and period for the base station to send the reference signal after the base station successfully contends for the unlicensed carrier. Herein, the synchronizing signal is sent in the subframe when the base station obtains the right to use the unlicensed carrier; the period of the synchronizing signal is a period of sending the synchronizing signal in the time of the unlicensed carrier occupied at the current time; and the sequence of the synchronizing signal is selected by the base station from a given synchronizing sequence set which is used for describing information about a time length that the base station occupies the unlicensed carrier.

In an exemplary embodiment, the moment that the base station successfully contends for the unlicensed carrier is used as a start point of subframes, subframes are divided backwards from the start point, and signals are received in a first LTE OFDM symbol of a first subframe obtained after division.

Embodiment 1

In step 1, a base station selects relatively idle unlicensed carriers as candidate unlicensed carriers to be preempted and used through measurement or a carrier selection mechanism.

If the base station has already selected an unlicensed carrier to be preempted, the base station may notify information such as a frequency point and bandwidth of the unlicensed carrier to UE through a licensed carrier (if the bandwidth is fixed, the bandwidth is not necessarily notified). Since accessible unlicensed carriers are many at an unlicensed band, by notifying the frequency point information of the unlicensed carrier to the subordinate UE, the situation that data are simultaneously received or blindly detected by the UE in a plurality of candidate unlicensed carriers can be avoided. The information may be transmitted to the UE when an RRC connection is established. The base station and the UE will both consider that the base station passes through the unlicensed carrier frequency point of the UE, the UE will be used as a configuration carrier of the UE, and the existing carrier configuration process during carrier aggregation is not performed any longer after the base station preempts the unlicensed carrier. When the unlicensed carriers supported by the UE and the base station are the same and form a unique set (the number of included unlicensed carriers is small), the information may be always defaulted to be configured on UE and base station sides and is information about unlicensed carriers in the unique set.

In step 2, the base station acquires start time for contending for a right to use the unlicensed carrier (the base station may acquire the start time by monitoring a fixed time length or receiving information about an occupation time length sent by a base station which occupies the unlicensed carrier), and the base station sends information about a start point of a contention backoff window to subordinate UE before a next time of participating in contending for the right to use the unlicensed carrier.

The information about the start time of the contention backoff window is computed according to timing of a licensed carrier (e.g., a frame number, a subframe number and an OFDM symbol of a licensed carrier). For example, when carrier aggregation (CA) is performed to a licensed carrier and an unlicensed carrier, subframes of the unlicensed carrier and the licensed carrier are aligned, and thus the base station may notify the UE about the start point of the contention backoff window for the base station to participate in contending for the unlicensed carrier through the licensed carrier. For example, as agreed, the start position of the subframe position described through the frame number and the subframe number is the start point of the contention backoff window for the base station to contend for the unlicensed carrier at a current time.

The purpose of notifying about the start point of the contention backoff window is to help the UE to clearly know a time domain range that data sent by the base station are possibly received, the UE may not perform receiving and blind detection before this time point and thereby the UE is helped to save power.

Before the base station starts the contention for the unlicensed carrier at a next time, the base station will notify the UE about the information about the backoff moment in the contention backoff window generated randomly at a next time of contention through a licensed carrier. The backoff moment may be remaining time of the contention at a previous time. For example, if a random backoff moment at a first time of contention is 50, subsequently the base station monitors that the channel is busy when a counter counts down to 30, thus the contention at a current time is stopped, the counter simultaneously pauses, the backoff moment of the base station is 30 when the base station contends at a next time and the backoff moment does not need to be generated again. A new moment value does not need to be randomly generated until the backoff moment is counted down to 0.

In step 3, if the base station always monitors that the unlicensed carrier is idle when the backoff moment is reached (i.e., when a numerical value corresponding to the backoff moment is counted down to 0), the base station considers that the unlicensed carrier is successfully preempted. The base station sends signals in a first OFDM symbol thereafter, herein the signals include a synchronizing signal and various reference signals. If the base station monitors that the unlicensed carrier is busy before the backoff moment is reached, the base station considers that the unlicensed carrier is not successfully preempted and the base station does not send signals until the unlicensed carrier is successfully preempted again at a next time.

The first OFDM symbol is determined according to a mode as follow: as illustrated in FIG. 1, the base station arranges OFDM symbols in the backoff moment in the contention backoff window according to an OFDM symbol time length starting from a start moment of a next subframe between the backoff moment in the contention backoff window and the start moment of the next subframe till a complete OFDM symbol cannot be arranged, and at this moment the first LTE OFDM symbol is an OFDM symbol closest to the backoff moment. It needs to be noted that possibly a complete LTE OFDM symbol does not exist, and at this moment the base station does not send the foresaid signals.

In step 4, after the UE receives the above-mentioned information, the UE respectively parses the information and determines a start moment that the base station to which the UE belongs participates in contending for the unlicensed carrier and a moment that data are possibly sent (after the backoff moment in the contention backoff window and in a time length of one LTE OFDM symbol) according to timing of a licensed carrier. In this embodiment, the timing of the licensed carrier is the same as the timing of the unlicensed carrier, the frame numbers and the subframe numbers are aligned, and thus the UE knows the frame number and the subframe of the unlicensed carrier as long as the UE knows the frame number and the subframe number of the licensed carrier.

The UE determines a start position (which may be a small range in order to avoid a timing error) of the first LTE OFDM symbol which needs to be blindly detected according to the foresaid mode of determining the first LTE OFDM symbol in accordance with the backoff moment in the contention window and the start moment of the next subframe, then starts to blindly detect signals which are possibly sent by the base station to which the UE belongs (e.g., blindly detects the synchronizing signal sent by the base station, for example, an LTE PSS/SSS sent in the first LTE OFDM symbol after the base station successfully contends for the unlicensed carrier as agreed between the base station and the UE before contention), considers that the base station to which the UE belongs successfully preempts the unlicensed carrier if blind detection succeeds, and may utilize these signals to perform necessary processing such as synchronization and measurement. If blind detection fails, the UE may considers that the base station to which the UE belongs fails to preempt the unlicensed carrier. However, at this moment, since there is a certain error probability in the blind detection performed by the UE, alternatively the UE still cannot completely exclude that the base station fails, and the UE still needs to detect whether there is control information thereof on the unlicensed carrier in a next sub frame.

Alternatively, the UE can determine whether to detect the signals sent after the base station to which the UE belongs successfully contends for the unlicensed carrier according to the backoff moment in the contention backoff window sent by the base station. For example, if the backoff moment notified by the base station to the UE is greater than a threshold, e.g., a complete OFDM symbol cannot exist between the backoff moment and the next subframe, the UE may not perform blind detection to the signals sent by the base station to which the UE belongs, and thereby the effect of saving energy is achieved.

Embodiment 2

The solution of embodiment 2 is similar to the solution of embodiment 1, and a difference just lies in that unlicensed carrier information sent by a base station to UE in embodiment 2 does not contain a backoff moment in a contention window.

Figure 2:
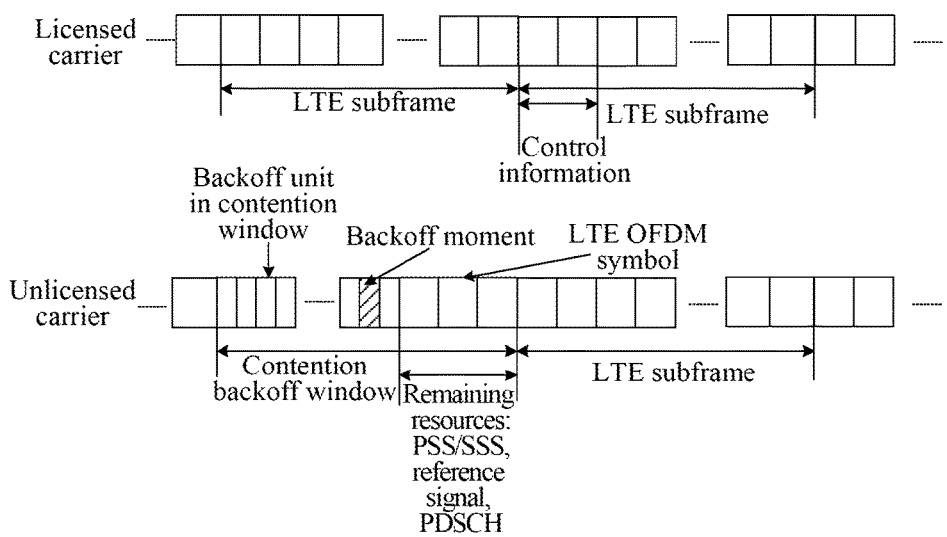
FIG. 2 illustrates a schematic diagram of utilization of an unlicensed carrier resource according to embodiment 2.

Refer to FIG. 2. After the base station in embodiment 2 successfully contends for the unlicensed carrier, the signals sent to the UE further contain service data signals, e.g., PDSCH, and other sent signals are the same as the signals in embodiment 1. Further, as agreed between the base station and the UE, after the base station successfully preempts the unlicensed carrier, the base station sends a PSS in a first LTE OFDM symbol and sends an SSS in a second LTE OFDM symbol. Or, an interchange mode may also be adopted. For example, as agreed between the base station and the UE, after the base station successfully preempts the unlicensed carrier, the base station sends an SSS in a first LTE OFDM symbol and sends a PSS in a second LTE OFDM symbol, and thereby an influence caused to normal blind detection performed by the UE to the PSS/SSS when the sending of the LTE PSS/SSS is supported in the unlicensed carrier can be avoided. The base station notifies the UE about a sequence of the sent PSS/SSS, or a sequence of the PSS/SSS is agreed between the base station and the UE in advance, e.g., it is agreed that the sequence of the PSS/SSS is the same as a sequence of a PSS/SSS of a corresponding licensed carrier.

In this embodiment, the base station further sends control information corresponding to the PDSCH in the licensed carrier. Alternatively, as illustrated in FIG. 2, the base station may send the control information in a next subframe of a subframe of a licensed carrier aligned to the contention backoff window in the unlicensed carrier, and for example, the base station sends the control information by using (e)PDCCH.

The base station may also send information, which describes a start OFDM symbol of a PDSCH sent by the base station in a subframe of the contention backoff window in the unlicensed carrier, through the licensed carrier. This information may be put in the same subframe for sending along with the control information and may also be contained in the control information for sending.

On the UE side, in this embodiment, the UE determines the start time that the base station starts contending for the unlicensed carrier according to the unlicensed carrier information (carrier frequency point and start point of contention backoff window) sent by the base station in combination with the subframe timing of the licensed carrier. Then, the UE receives all data in the unlicensed carrier starting from this moment and saves the data. And then the UE receives the control information and the information which describes the start OFDM symbol of the PDSCH in a next subframe of a subframe of a licensed carrier aligned to the contention backoff window of the unlicensed carrier. The UE determines whether the control information contains the control information of the UE according to a blind detection mode. If yes, the received data are intercepted and decoded according to the control information. Or, the UE may also blindly detect the PSS and SSS (base station) according to the LTE OFDM symbol in the unlicensed carrier starting from the start point of the contention backoff window. At this moment, if the UE can detect the PSS/SSS agreed with the base station or the PSS/SSS notified by the base station, the UE may confirm that the base station to which the UE belongs successfully contends for the unlicensed carrier, confirm the start LTE OFDM that the base station sends signals, and determine the reference signal sent by the base station from the saved data, herein the reference signal may be used for synchronization, measurement, etc.

Embodiment 3

Figure 3:
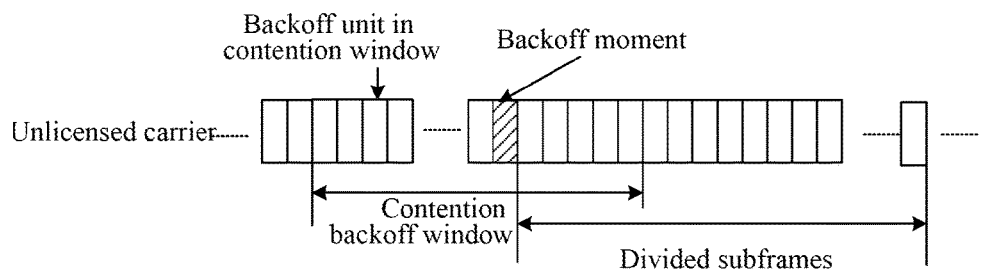
FIG. 3 illustrates a schematic diagram of utilization of an unlicensed carrier resource according to embodiment 3.

In embodiment 1 and embodiment 2, the subframes of the unlicensed carrier and the licensed carrier are aligned, and the base station arranges OFDM symbols for sending signals in the backoff moment in the contention backoff window according to an OFDM symbol time length starting from the start moment of the next subframe. However, in embodiment 3, after the base station successfully contends for the unlicensed carrier, i.e., if the base station monitors that the carrier is always idle when the backoff moment in the contention window thereof is reached, the base station directly uses this moment as a start moment of subframes, backwards divides subframes according to the LTE subframe time length (as illustrated in FIG. 3), and sends signals in the divided subframes.

On the UE side, the signals sent by the base station to which the UE belongs still need to be blindly detected to judge whether the base station to which the UE belongs obtains the right to use the unlicensed carrier. Or, the UE may also make a judgment according to the control information in the licensed carrier, the sending mode of the control information is the same as that in embodiment 2 and the detection mode is also the same.

In this embodiment, the subframes of the unlicensed carrier and the corresponding licensed carrier are not aligned, the base station and the UE need to agree to establish a corresponding relationship between the subframes of the unlicensed carrier and the subframes of the corresponding licensed carrier in advance, and then, when the base station performs cross-carrier scheduling or the UE performs cross-carrier feedback, the base station and the UE both perform sending and receiving in the licensed carrier according to the one-to-one corresponding relationship.

Embodiment 4

In this embodiment, a mode which is the same as the mode in embodiment 1, 2 and 3 may be used for sending and receiving signals by using the unlicensed carrier. In this embodiment, after the base station successfully contends for the unlicensed carrier, the remaining resources in the contention backoff window are used for sending the reference signal. The period, the port and the type of the reference signal need to be notified by the base station to the UE in advance or need to be agreed with the UE in advance, and need to be fixed. For example, when the reference signal is a CSI-RS, the base station may reach an agreement with the UE about the period and the port of the CSI-RS, thereby the configuration information such as the period and port of the CSI-RS is notified to the UE without using the existing RRC message, and the time is saved.

After the UE side detects that the base station to which the UE belongs successfully preempts the unlicensed carrier, the UE will parse the corresponding reference signal from the received data and thus the reference signal is used for channel measurement. By adopting this mode, the problem of configuration delay of the existing reference signal can be avoided and thereby the utilization efficiency in the time that the base station successfully preempts the unlicensed carrier is improved.

Embodiment 5

A base station sends the following information to UE through a licensed carrier: unlicensed carrier configuration information, start point of contention backoff window and backoff moment in contention backoff window.

Herein, the unlicensed carrier configuration information is defined as follow: the base station and the UE both consider that, once the unlicensed carrier in the configuration information is successfully preempted by the base station, the carrier is an auxiliary component carrier which is configured by the base station for the UE and is in an activated state. If the base station to which the UE belongs does not occupy the unlicensed carrier, the configuration is not effective. The configuration information may include one or more of the following parameters: frequency point, bandwidth and serial number of unlicensed carrier (the serial number is a uniform serial number specified when unlicensed carriers are divided under the control of the country, and the serial number may represent frequency point and bandwidth). The unlicensed carrier configuration information is sent in a licensed carrier through an RRC message sending or DCI signaling sending.

Herein, the start point of the contention backoff window has the following two types: a first type is that the start point is a start position of a subframe or an end position of a subframe; and a second type is that the start point starts from an LTE OFDM symbol in a subframe, alternatively it starts from a first OFDM symbol after a PDCCH, herein the number of PDCCH symbols may be fixed or variable. The start point may be described according to the following mode: three parameters, i.e., respectively radio frame, subframe and LTE OFDM symbol position are introduced to describe the position of the start point, herein the frame number, the subframe number and the LTE OFDM symbol position are arranged with reference to a corresponding licensed carrier. Herein, the LTE OFDM symbol parameter is used as an optional parameter. The information about the start point of the contention backoff window is sent in a licensed carrier through DCI signaling sending or an RRC message sending.

Herein, the backoff moment in the contention backoff window is defined as follows. The base station randomly generates a numerical value within a time length range of the contention window, the numerical value corresponds to the backoff moment in the contention window, the base station counts in a progressive decrease mode from the numerical value, and one time of progressive decrease represents that the time length experiences one backoff unit in the contention window. Or, if a random numerical value at a previous time is not progressively decreased to 0, during contention at a next time, the numerical value suspended at the previous time is still used for counting. The backoff moment may be described by adopting a numerical value corresponding to a bit. The information about the backoff moment in the contention backoff window is sent in a licensed carrier through an RRC message sending or DCI signaling sending.

After the base station successfully preempts the unlicensed carrier in the contention backoff window, the base station determines remaining complete LTE OFDM symbols, and sends the following signals in the symbols or occupied time length according to the agreement with the UE or the unlicensed carrier configuration information: start symbol identification information, synchronizing signal, reference signal and PDSCH (including a system broadcasting message). The configuration information of the above-mentioned signals may be sent in a licensed carrier through an RRC message or DCI signaling.

Herein, with respect to the start symbol identification information, the start symbol identification information essentially is a sequence. This sequence may be a sequence agreed between the base station and the UE or a sequence configured by the base station, and as agreed between the base station and the UE, the sequence is sent in the LTE OFDM position in the remaining resources. Alternatively, the sequence is a preamble code or an LTE PSS (/SSS). When the LTE PSS/SSS is used, alternatively the LTE PSS/SSS is designed to be different from LTE PSS/SSS specified in 3GPP TS 36.211 V10.2.0 and is sent in a frequency domain position in a carrier. Or an interval different from that between LTE PSS/SSS specified in 3GPP TS 36.211 V10.2.0 is kept between PSS/SSS, or a time order of the PSS/SSS is different from that of LTE PSS/SSS specified in 3GPP TS 36.211 V10.2.0. Alternatively, the identification information may also be used for a synchronization purpose. The identification information is sent in a licensed carrier through an RRC message or DCI signaling.

Herein, with respect to the synchronizing signal, within the time length that the base station occupies the unlicensed carrier, the period and start subframe position for sending the synchronizing signal are agreed between the base station and the UE or are configured by the base station. Herein, whether there is the synchronizing signal is notified. An alternative synchronizing signal is an LTE PSS/SSS. The start subframe position is described by adopting a frame and a subframe. For example, the base station and the UE may agree that the synchronizing signal is sent starting from a first complete OFDM symbol which is occupied. The configuration information of the synchronizing signal is sent in a licensed carrier through an RRC message or DCI signaling.

Herein, with respect to the reference signal, the sent reference signal is agreed between the base station and the UE or is configured by the base station, and the configuration information is sent to the UE. The reference signal includes CSI-RS, CRS, DMRS, discovery signal and monitored RS. In case of CSI-RS, as agreed between the base station and the UE or configured by the base station, the base station starts sending CSI-RS as soon as the base station successfully preempts the unlicensed carrier, and if the UE judges that the base station to which the UE belongs successfully preempts the unlicensed carrier, the UE considers that there is agreed CSI-RS which is sent in the unlicensed carrier. In other words, that the base station successfully preempts the unlicensed carrier is used as an event for triggering the sending of the CSI-RS, and thereby the CSI-RS high-layer configuration signaling is omitted. The configuration information of the reference signal is sent in a licensed carrier through an RRC message or DCI signaling.

Herein, with respect to the PDSCH, it is UE data or a system broadcasting message. When the PDSCH is transmitted, the control information corresponding thereto is transmitted in a licensed carrier, and a time domain position is in a next subframe of a subframe corresponding to the contention backoff window.

On the UE side, the UE receives the above-mentioned information and determines, according to the parameters in the information, the unlicensed carrier in which the signals sent by the base station to which the UE belongs are possibly received, and the moment that the signals are received (i.e., the backoff moment in the contention backoff window). Possibly received signals which are sent by the base station to which the UE belongs are determined according to the configuration information of the signals. The PDSCH thereof is received according to the control signaling.

Herein, the UE determines the moment that the unlicensed carrier needs to be received according to the frame timing of the licensed carrier, starts receiving data and blindly detects the start symbol identification information (sequence) after the moment, so as to determine the start LTE OFDM symbol position of the remaining resources. The reference signal sent by the base station is received according to the configuration information and measurement is performed. The UE receives the corresponding control information in the remaining resources from a next subframe of the licensed carrier and parses the data or broadcasting information thereof according to the control information.

Other processing processes on the UE side are inverse processes of the processing processes on the base station side, and thus are not repetitively described here.

Embodiment 6

The difference of this embodiment from embodiment 5 lies in that:

A base station sends the following information to the UE through a licensed carrier: unlicensed carrier configuration information and start point of contention backoff window.

After the base station successfully preempts the unlicensed carrier in the contention backoff window, the base station determines remaining complete LTE OFDM symbols, and sends the following signals in the OFDM symbols or the occupied time length according to the agreement with the UE or the configuration information: synchronizing signal, reference signal and PDSCH (including a system broadcasting message).

The base station sends the control information of the unlicensed carrier in the licensed carrier and sends the control information in a next subframe of a subframe corresponding to the contention window. Herein, the control information includes resource allocation information of the PDSCH and a start symbol position of LTE OFDM symbols in the remaining resources.

Herein, the configuration information of the synchronizing signal, the configuration information of the reference signal and the control information corresponding to the PDSCH may be sent through DCI or sent independent of the control information of the unlicensed carrier.

On the UE side, the UE receives the above-mentioned information, the signals and the control information of the unlicensed carrier, determines a time point for receiving the signals according to relevant information in the signaling and the control information, parses the data and simultaneously receives the synchronizing signal and the reference signal within the time length subsequently occupied by the base station according to the configuration information of the signals.

Embodiment 7

A base station sends signaling 1 to UE through a licensed carrier.

After the base station successfully preempts an unlicensed carrier in a contention backoff window, the base station determines remaining complete LTE OFDM symbols, and sends the following signals in the symbols or occupied time length according to the agreement with the UE or configuration information: synchronizing signal, reference signal and PDSCH (including a system broadcasting message).

Herein, the signaling 1 is sent in a licensed carrier through DCI and the signaling 1 includes that unlicensed carrier configuration information, LTE OFDM symbol positions in remaining resources, synchronizing signal configuration information, reference signal configuration information and control information corresponding to PDSCH.

Unlicensed carrier configuration, symbol positions in remaining resources, synchronizing signal configuration and reference signal configuration and triggering may all be the same as that in embodiment 5.

On the UE side, the UE receives and saves data in each unlicensed carrier, monitors and detects each subframe of the licensed carrier, searches DCI to discover the above-mentioned signaling 1 and decodes the signaling 1 to acquire relevant information in DCI. The saved data are further parsed according to the relevant information. Other processing processes on the UE side are inverse processes of the processing processes on the base station side, and thus are not repetitively described here.

Embodiment 8

When a base station judges that a contention backoff moment is located within a time period of a last LTE OFDM symbol, the base station may send DCI signaling to notify UE, the base station will not send signals in remaining resources and thus the UE does not perform blind detection or receiving and saving.

Or, the base station sends the contention backoff moment to the UE, the UE makes a judgment, and when the backoff moment is located within the time period of the last LTE OFDM symbol, the UE considers that the base station will not send signals in the remaining resources and thus the UE does not perform blind detection or receiving and saving.

Embodiment 9

A base station determines the number of unlicensed carriers which can be preempted. The number and frequency points of the unlicensed carriers are generally determined and configured by an operator for the base station during deployment, and for example, are configured to the base station according to an OAM mode. Unlicensed carriers which can be preempted by the base station thereafter can only be these unlicensed carriers which are configured.

The base station sends, in a licensed carrier, configuration information of unlicensed carriers which may possibly be contended by the base station to subordinate UE through an RRC message. It shall be noted that, at this moment, if the number of the unlicensed carriers which can be selected by the base station is comparatively small (e.g., the number is 1 or 2 and the frequency points are close), the base station may configure all unlicensed carriers to the subordinate UE. And if the number of the unlicensed carriers which can be selected by the base station is comparatively great, the base station may respectively configure different unlicensed carriers to different UE, for a main purpose of reducing the number of the unlicensed carriers which are monitored or received by the UE. Unlicensed carrier configuration information may be semi-statically updated or not updated any longer after configuration (e.g., the base station only has one unlicensed carrier). Another mode is that the base station notifies the UE about unlicensed carriers which are to be contended in a plan before each time of contention. At this moment, in order to guarantee the timeliness, the base station can adopt DCI information to send unlicensed carrier configuration information to the UE. Or, the base station adopts an RRC message and DCI combination mode to configure unlicensed carriers for the UE, the base station firstly configures unlicensed carriers to the UE through the RRC message, then when the base station configures unlicensed carriers for the UE through DCI before contention, the UE considers that the unlicensed carriers which are contended are based on DCI signaling at a current time of contention. And before a next time of contention, if the UE does not receive the DCI signaling sent by the base station, the UE considers that the unlicensed carriers which are contended by the base station are based on the notification through the RRC message before. This mode is suitable for the situation that the number of the unlicensed carriers which are selectively contended by the base station is comparatively great, thereby the flexibility of system contention can be improved and the probability of UE scheduling in the unlicensed carriers can be increased.

The DCI signaling is unlicensed carrier configuration and may be described by adopting agreed bits in the existing DCI format, other bits are reserved, and a new DCI format may also be designed for transmitting the above-mentioned signaling.

The base station sends information about a start moment of the contention backoff window to the UE through a licensed carrier, and the information about the start moment of the contention backoff window may be sent through a DCI format. In this embodiment, the base station may send the foresaid unlicensed carrier configuration information and the information about the start moment of the contention backoff window to the UE through the same DCI, so as to reduce signaling transmission times.

The base station performs the backoff contention for the unlicensed carrier at the determined start moment of the contention backoff window. If the contention performed by the base station succeeds, the base station determines remaining resources in a subframe of the contention window, the base station places LTE OFDM symbols from the end moment of the subframe to the start moment till a complete LTE OFDM symbol cannot be placed between the start moment and the time point that the base station successfully contends for the unlicensed carrier, at this moment the complete LTE OFDM symbols in the subframe are remaining resources, the base station sends a PDSCH to the UE in the remaining resources, and the control signaling of the PDSCH is sent in a PDCCH of a next subframe of a licensed carrier according to a DCI format. The base station sends CSI-RS in the remaining resources and the occupation time length thereafter, and the base station sends the configuration information of the CSI-RS in a PDCCH of a next subframe of a licensed carrier in a DCI format (the CSI-RS is used for CSI measurement of the UE). The base station sends start symbol identification information such as a PSS/SSS for configuring LTE in the agreed LTE OFDM symbols of the remaining resources (at this moment a synchronizing function is required only), at this moment the sequence is opposite to that of the LTE, and the base station sends the sequence of the start symbol identification information and the symbol position information in the foresaid PDCCH according to a DCI format. And it is supposed that the time length occupied by the base station at a current time is 5 ms, the base station configures that the LTE PSS/SSS is only sent in a first subframe in complete subframes within the occupation time length (at this moment mainly because the occupation time at the current time is short), the same PCI as the licensed carrier is used (the base station may also temporarily select suitable PCI for configuration according to PCI of surrounding cells), the sending configuration information of the synchronizing signal (including the sent subframe position, period and sequence) is sent in the foresaid PDCCH according to a DCI format and may also be sent as agreed between the base station and the UE in advance, and for example, when the start symbol identification information is sent in the occupation time length equal to 5 and the remaining resources, the LTE PSS/SSS is sent only in a first complete subframe.

The base station sends the foresaid various information according to a DCI format in a PDCCH of a next subframe of a subframe corresponding to the contention backoff window in the licensed carrier.

On the UE side, the UE receives the unlicensed carrier configuration information and the information about the start moment of the contention backoff window sent by the base station, and the UE receives and saves data starting from the start moment of the contention backoff window of the corresponding unlicensed carrier (in this embodiment it is supposed that the start moment is the start moment of the subframe). Then, in a next subframe of a subframe corresponding to the contention backoff window, the UE receives the configuration information of other parameters in the remaining resources and the time length occupied by the base station in the licensed carrier. The UE performs blind detection in a PDCCH domain according to the agreed DCI format to obtain the needed DCI format signaling. Relevant signaling is parsed, and processing such as synchronization, data interception and reference signal acquisition are respectively completed according to parameters in the signaling. Other processing processes on the UE side are inverse processes of the processing processes on the base station side, and thus are not repetitively described here.

Embodiment 10

Figure 4:
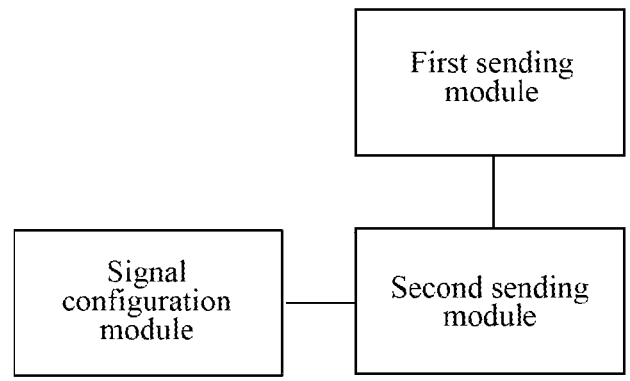
FIG. 4 illustrates a structural schematic diagram of a base station according to embodiment 10.

This embodiment provides a base station and receiving end. As illustrated in FIG. 4, the base station provided by this embodiment includes a first sending module, herein, the first sending module is arranged to send unlicensed carrier information, herein the unlicensed carrier information may be sent through a licensed carrier. The base station may also include a second sending module arranged to, after the base station successfully contends for a right to use the unlicensed carrier in a contention backoff window, send signals to the UE by using remaining resources in the contention backoff window and/or subframes after the remaining resources, herein the remaining resources include complete Orthogonal Frequency Division Multiplexing OFDM symbols which are located in the contention backoff window and after the moment that the right to use the unlicensed carrier is contended, or complete OFDM symbols between a moment that the base station successfully contends for the right to use the unlicensed carrier and an end moment of a subframe in which the moment is located.

In an exemplary embodiment, the unlicensed carrier information includes one or more pieces of the following information: information about a start time of a contention backoff window and information about a backoff moment in the contention backoff window.

The signals include one or more of the following signals: start symbol identification, synchronizing signal, reference signal and service data signal.

In an exemplary embodiment, when the signals include the service data signal, the first sending module is further arranged to send control information corresponding to the service data to the UE through the licensed carrier, or send the control information to the UE in a next subframe of a subframe of the remaining resources in the unlicensed carrier.

In an exemplary embodiment, when the unlicensed carrier information does not include the backoff moment in the contention backoff window, the control information includes the backoff moment in the contention backoff window or position information which describes the OFDM symbol in which the base station sends the signals in the subframe of the unlicensed carrier.

In an exemplary embodiment, the OFDM symbol position information is a serial number of the OFDM symbol, and the serial number is arranged from the end moment of the subframe corresponding to the moment that the unlicensed carrier is successfully contended to the moment that the base station successfully contends for the unlicensed carrier.

In an exemplary embodiment, the OFDM symbol position information is a serial number of the OFDM symbol, and the serial number is arranged from the end moment of the subframe corresponding to the moment that the unlicensed carrier is successfully contended to the end moment of the subframe. In an exemplary embodiment, the start symbol identification is used for identifying the start position of the complete LTE OFDM symbols in the remaining resources. And the start symbol identification is a sequence which is agreed between the base station and the UE or is configured by the base station.

The base station further includes a signal configuration module arranged to agree with the UE about a sequence in advance or configure the sequence, the UE agrees the LTE OFDM position for sending the sequence in the remaining resources, and when the base station configures the sequence corresponding to the start symbol identification, the base station sends the configuration information of the start symbol identification to the UE in a licensed carrier through an RRC message or DCI signaling.

In an exemplary embodiment, the base station further includes a signal configuration module arranged to agree with the UE about or configure a reference signal to be sent in advance, and send the configuration information of the reference signal to the UE through an RRC message or DCI signaling of a licensed carrier. And the reference signal includes CSI-RS, CRS, DMRS, discovery signal or monitored RS.

In an exemplary embodiment, the base station further includes a signal configuration module arranged to agree with the UE about or configure a period and a start subframe position for sending a synchronizing signal in advance.

Figure 5:
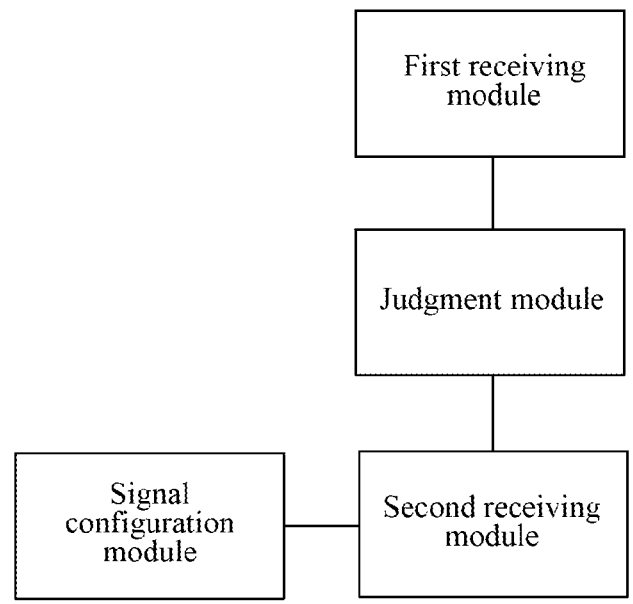
FIG. 5 illustrates a structural schematic diagram of a receiving end according to embodiment 10.

As illustrated in FIG. 5, the receiving end provided by this embodiment includes a first receiving module, herein the first receiving module is arranged to receive unlicensed carrier information sent by a sending end, herein the unlicensed carrier information may be received through a licensed carrier.

The receiving end may further include the following modules a judgment module is arranged to judge whether a base station obtains a right to use the unlicensed carrier according to the unlicensed carrier information.

a second receiving module is arranged to, if the judgment module judges that the base station obtains the right to use the unlicensed carrier, receive signals, which are sent by the base station by using remaining resources in the contention backoff window and/or subframes after the remaining resources, by using the unlicensed carrier information, herein the remaining resources include complete orthogonal frequency division multiplexing OFDM symbols which are located in the contention backoff window and after a moment that the right to use the unlicensed carrier is contended, or complete OFDM symbols between a moment that the base station successfully contends for the right to use the unlicensed carrier and an end moment of a subframe in which the moment is located.

In an exemplary embodiment, the unlicensed carrier information includes one or more pieces of the following information: information about a start moment of a contention backoff window and information about a backoff moment in the contention backoff window.

The signals include one or more of the following signals: start symbol identification, synchronizing signal, reference signal and service data signal.

In an exemplary embodiment, when the signals include the service data signal, the first receiving module is further arranged to receive control information corresponding to the service data from the licensed carrier, or receive the control information in a next subframe of a subframe of the remaining resources in the unlicensed carrier.

In an exemplary embodiment, when the unlicensed carrier information does not include the backoff moment in the contention backoff window, the control information includes the backoff moment in the contention backoff window or position information which describes the OFDM symbol in which the base station sends the signals in the subframe of the unlicensed carrier.

In an exemplary embodiment, the OFDM symbol position information is a serial number of the OFDM symbol, and the serial number is arranged from the end moment of the subframe corresponding to the moment that the unlicensed carrier is successfully contended to the moment that the base station successfully contends for the unlicensed carrier.

In an exemplary embodiment, the OFDM symbol position information is a serial number of the OFDM symbol, and the serial number is arranged from the end moment of the subframe corresponding to the moment that the unlicensed carrier is successfully contended to the end moment of the subframe. In an exemplary embodiment, the start symbol identification is used for identifying the start position of the complete LTE OFDM symbols in the remaining resources. And the start symbol identification is a sequence which is agreed between the base station and the UE or is configured by the base station.

The receiving end further includes a signal configuration module arranged to agree with the base station about a sequence in advance and the LTE OFDM position for sending the sequence in the remaining resources, or receive the configuration information of the start symbol identification sent by the base station in a licensed carrier through an RRC message or DCI signaling.

In an exemplary embodiment, the receiving end further includes a signal configuration module arranged to agree with the base station about a reference signal to be sent, and receive the configuration information of the reference signal sent by the base station through an RRC message or DCI signaling of a licensed carrier. And the reference signal includes CSI-RS, CRS, DMRS, discovery signal or monitored RS.

In an exemplary embodiment, the receiving end further includes a signal configuration module arranged to agree with the base station about or receive a period and a start subframe position configured by the base station for sending a synchronizing signal in advance.

In an exemplary embodiment, the first receiving module is arranged to receive unlicensed carrier information sent by the sending end in a licensed carrier through an RRC message, or receive DCI sent by the sending end in a PDCCH or ePDCCH of a licensed carrier, herein a bit in the DCI describes the unlicensed carrier information.

The receiving end in this embodiment of the present disclosure may be UE and may also be a base station of a small cell under a macro base station, and the sending end in this embodiment may be a common base station and may also be a base station of a small cell under a macro base station.

This embodiment of the present disclosure may also be applicable to a scenario that UE directly contends for a right to use an unlicensed carrier (at this moment the UE is equivalent to a base station), and corresponding information or signal configuration information may also be sent to a base station or other UE through Uplink Control Information (UCI) at this moment. The embodiments in the present disclosure may be combined in use under the situation of no conflict.

The embodiment of the present disclosure further provides a computer-readable storage medium, storing computer-executable instructions used for executing the above-mentioned method.

One skilled in the art can understand that all or partial steps in the above-mentioned methods may be completed by relevant hardware instructed by a program, and the program may be stored in a computer-readable storage medium such as a read-only memory, a magnetic disc or a compact disc, etc. Optionally, all or partial steps in the above-mentioned embodiments may also be implemented by using one or more integrated circuits. Correspondingly, each module/unit in the above-mentioned embodiments may be implemented by means of hardware and may also be implemented by means of a software function module. The present disclosure is not limited to combinations of hardware and software in any specific form.

INDUSTRIAL APPLICABILITY

According to the embodiment of the present disclosure, in a process of contending for a right to use an unlicensed carrier, by sending and receiving relevant information of the unlicensed carrier, a receiving end can be enabled to rapidly find that a base station to which the receiving end belongs obtains the right to use the unlicensed carrier, the complexity is low, the power consumption is small and thereby subsequent partial incomplete subframe resources can be utilized.

What is claimed is:

1. A method for sending unlicensed carrier information, applied to a base station, the method comprising: sending unlicensed carrier information, wherein the unlicensed carrier information comprises one or more pieces of following information: information about a start point of a contention backoff window and information about a backoff moment in the contention backoff window;
   wherein the information about the start point of the contention backoff window comprises a subframe number and a frame number of subframe corresponding to a position of the start point of the contention backoff window, wherein the arrangement of the subframe number and the frame number is consistent with the arrangement of a subframe number and a frame number of a licensed carrier corresponding to the unlicensed carrier,
   when no monitoring for a fixed time length is performed before the contention backoff window,
     a start point of a subframe corresponding to the subframe number and the frame number is the start point of the contention backoff window; or an end point of a subframe corresponding to the subframe number and the frame number is the start point of the contention backoff window;
   or
   when monitoring for a fixed time length is performed before the contention backoff window,
     the start point of the contention backoff window is an end point of the fixed time length, and a start point of a subframe corresponding to the subframe number and the frame number is a start point of the fixed time length; or an end point of a subframe corresponding to the subframe number and the frame number is a start point of the fixed time length.

2. The method according to claim 1, wherein,
   the base station describes the information about the backoff moment in the contention backoff window through a bit in DCI and sends the DCI in a PDCCH or an ePDCCH.

3. The method according to claim 1, wherein,
   the start point of the contention backoff window refers to start time of a contention backoff window for contending for an unlicensed carrier at a single time,
   the information about the start point of the contention backoff window further comprises a serial number of an OFDM symbol corresponding to the position of the start point of the contention backoff window, and
   the OFDM symbol corresponding to the position of the start point of the contention backoff window is a kth OFDM symbol after a Physical Downlink Control Channel PDCCH, wherein k is an integer greater than or equal to 1.

4. The method according to claim 1, wherein the method further comprises:
   performing monitoring to the unlicensed carrier before the contention backoff moment, and confirming that the base station obtains a right to use the unlicensed carrier if a monitoring result is that the unlicensed carrier is idle when the contention backoff moment is reached; and suspending monitoring if a monitoring result is that the unlicensed carrier is busy before the contention backoff moment is reached, recording a moment corresponding to a suspending moment and confirming that contention for the unlicensed carrier at a current time fails;
   or
   the unlicensed carrier information further comprises unlicensed carrier configuration information, and the unlicensed carrier configuration information comprises one or more of the following: unlicensed carrier frequency point, bandwidth and a serial number of unlicensed carrier;
   once the base station successfully contends for a right to use the unlicensed carrier described in the unlicensed carrier configuration information, the unlicensed carrier is an auxiliary component carrier which is configured by the base station for a receiving end and is in an activated state; and if the base station does not successfully contend for the right to use the unlicensed carrier, the unlicensed carrier configuration information is not effective to the receiving end;
   or
   the unlicensed carrier information is sent in a licensed carrier through an RRC message, or the unlicensed carrier information is described through a bit in DCI and the DCI is sent through a PDCCH or an ePDCCH of a licensed carrier.

5. A method for receiving unlicensed carrier information, applied to a receiving end, the method comprising:
   receiving unlicensed carrier information sent by a sending end, wherein the unlicensed carrier information comprises one or more pieces of following information: information about a start point of a contention backoff window and information about a backoff moment in the contention backoff window;
   wherein the information about the start point of the contention backoff window comprises a subframe number and a frame number of subframe corresponding to a position of the start point of the contention backoff window, wherein the arrangement of the subframe number and the frame number is consistent with the arrangement of a subframe number and a frame number of a licensed carrier corresponding to the unlicensed carrier,
   when no monitoring for a fixed time length is performed before the contention backoff window,
     a start point of a subframe corresponding to the subframe number and the frame number is the start point of the contention backoff window; or an end point of a subframe corresponding to the subframe number and the frame number is the start point of the contention backoff window;
   or
   when monitoring for a fixed time length is performed before the contention backoff window,
     the start point of the contention backoff window is an end point of the fixed time length, and a start point of a subframe corresponding to the subframe number and the frame number is a start point of the fixed time length; or an end point of a subframe corresponding to the subframe number and the frame number is a start point of the fixed time length.

6. The method according to claim 5, wherein,
   receiving the unlicensed carrier information sent by the sending end comprises receiving DCI in a PDCCH or an ePDCCH, and a bit in the DCI describes the information about the backoff moment in the contention backoff window.

7. The method according to claim 5, wherein,
the start point of the contention backoff window refers to start time of a contention backoff window for contending for an unlicensed carrier at a single time,
the information about the start point of the contention backoff window further comprises a serial number of a start OFDM symbol corresponding to the position of the start point of the contention backoff window, and
the OFDM symbol corresponding to the position of the start point of the contention backoff window is a kth OFDM symbol after a Physical Downlink Control Channel PDCCH, wherein k is an integer greater than or equal to 1.

8. The method according to claim 5, wherein,
the unlicensed carrier information further comprises unlicensed carrier configuration information, and the unlicensed carrier configuration information comprises one or more of the following: unlicensed carrier frequency point, bandwidth and a serial number of unlicensed carrier;
or
the receiving end receives an RRC message in a licensed carrier and the RRC message carries the unlicensed carrier information, or the receiving end receives DCI in a PDCCH or an ePDCCH of a licensed carrier and a bit in the DCI describes the unlicensed carrier information.

9. An apparatus for receiving unlicensed carrier information, applied to a receiving end, the apparatus comprising hardware configured to execute instructions stored in a computer-readable storage medium to perform:
receiving unlicensed carrier information sent by a sending end, wherein the unlicensed carrier information comprises one or more pieces of following information: information about a start point of a contention backoff window and information about a backoff moment in the contention backoff window;
wherein the information about the start point of the contention backoff window comprises a subframe number and a frame number of subframe corresponding to a position of the start point of the contention backoff window, wherein the arrangement of the subframe number and the frame number is consistent with the arrangement of a subframe number and a frame number of a licensed carrier corresponding to the unlicensed carrier,
when no monitoring for a fixed time length is performed before the contention backoff window,
a start point of a subframe corresponding to the subframe number and the frame number is the start point of the contention backoff window; or an end point of a subframe corresponding to the subframe number and the frame number is the start point of the contention backoff window;
or
when monitoring for a fixed time length is performed before the contention backoff window,
the start point of the contention backoff window is an end point of the fixed time length, and a start point of a subframe corresponding to the subframe number and the frame number is a start point of the fixed time length; or an end point of a subframe corresponding to the subframe number and the frame number is a start point of the fixed time length.

10. The apparatus according to claim 9, wherein, the instructions further comprise following instructions to perform:
receiving DCI in a PDCCH or an ePDCCH, and a bit in the DCI describes the information about the backoff moment in the contention backoff window.

11. The apparatus according to claim 9, wherein,
the start point of the contention backoff window refers to start time of a contention backoff window for contending for an unlicensed carrier at a single time,
the information about the start point of the contention backoff window further comprises a serial number of a start OFDM symbol corresponding to the position of the start point of the contention backoff window, and
the OFDM symbol corresponding to the position of the start point of the contention backoff window is a kth OFDM symbol after a Physical Downlink Control Channel PDCCH, wherein k is an integer greater than or equal to 1.

12. The apparatus according to claim 9, wherein,
the unlicensed carrier information further comprises unlicensed carrier configuration information, and the unlicensed carrier configuration information comprises one or more of following: unlicensed carrier frequency point, bandwidth and a serial number of unlicensed carrier;
or
the receiving module receives an RRC message in a licensed carrier and the RRC message carries the unlicensed carrier information, or the receiving module receives DCI in a PDCCH or an ePDCCH of a licensed carrier and a bit in the DCI describes the unlicensed carrier information.

* * * * *